United States Patent
Francois

(10) Patent No.: US 7,753,799 B2
(45) Date of Patent: Jul. 13, 2010

(54) CONSTANT VELOCITY JOINT

(75) Inventor: Marc Francois, Noisy le Roi (FR)

(73) Assignee: GKN Driveline S.A., Carrieres-sous-Poissy (FR)

( * ) Notice: Subject to any disclaimer, the term of this patent is extended or adjusted under 35 U.S.C. 154(b) by 340 days.

(21) Appl. No.: 10/584,795

(22) PCT Filed: Nov. 24, 2004

(86) PCT No.: PCT/FR2004/003013

§ 371 (c)(1), (2), (4) Date: Jun. 28, 2006

(87) PCT Pub. No.: WO2005/073578

PCT Pub. Date: Aug. 11, 2005

(65) Prior Publication Data

US 2007/0135219 A1   Jun. 14, 2007

(30) Foreign Application Priority Data

Dec. 29, 2003 (FR) .................................. 03 15538

(51) Int. Cl.
 *F16D 3/205* (2006.01)
(52) U.S. Cl. ...................... 464/111; 464/905
(58) Field of Classification Search ................. 464/111, 464/905
See application file for complete search history.

(56) References Cited

U.S. PATENT DOCUMENTS

| 5,203,741 | A | 4/1993 | Turner | |
|---|---|---|---|---|
| 5,330,389 | A | 7/1994 | Jost et al. | |
| 5,376,049 | A * | 12/1994 | Welschof et al. | 464/111 |
| 6,497,621 | B2 | 12/2002 | Kudo et al. | |
| 6,749,516 | B2 | 6/2004 | Margerie | |
| 2001/0005694 | A1 * | 6/2001 | Olszewski | |
| 2002/0045486 | A1 | 4/2002 | Kudo et al. | |
| 2003/0078107 | A1 * | 4/2003 | Margerie | 464/111 |
| 2006/0105845 | A1 * | 5/2006 | Girguis | 464/111 |

FOREIGN PATENT DOCUMENTS

| DE | 39 36 603 | 5/1991 |
|---|---|---|
| FR | 2 819 863 | 7/2002 |

OTHER PUBLICATIONS

International Search Report dated Jan. 3, 2005 from PCT/FR2004/003013. (3 pages).

* cited by examiner

*Primary Examiner*—Greg Binda
(74) *Attorney, Agent, or Firm*—Rader, Fishman & Grauer PLLC

(57) ABSTRACT

A constant velocity joint (1) comprising: a male element (2) with multiple arms (4), a female element (8) having a central axis (X'-X') and defining tracks (9A, 9B) which are symmetrical in relation to a radial longitudinal plane (P), and an outer roller (12) with a rolling surface (30). The tracks and the rolling surface define two contact points (Z1, Z2) therebetween. The tangent planes of the track and rolling surface coincide and are parallel to the plane (P) at not less than one contact point. The cross profiles of the tracks and rolling surface at not less than one contact point are rectilinear or convex.

12 Claims, 4 Drawing Sheets

CONSTANT VELOCITY JOINT

TECHNICAL FIELD

The present invention relates to a constant velocity joint of the type comprising a male element featuring multiple arms, a female element having a central axis and defining, in respect of each arm, a pair of opposed tracks which are situated on either side of said arm and which are symmetrical in relation to a radial longitudinal plane of the female element, and, mounted on each arm, a mechanical transmission unit comprising an outer rotating roller mounted so as to plunge and slide in relation to the arm and designed to roll on one or other of the corresponding two tracks via a peripheral rolling surface of circular cross-section, the female element furthermore comprising at least one bearing surface which keeps the roller from becoming displaced radially outwards.

BACKGROUND

The invention is particularly suited to tripod constant velocity joints used for motor vehicle transmission systems.

Such a tripod constant velocity joint generally comprises a male element with ternary symmetry, or tripod, which is integral with a first rotatory shaft, and a female element with ternary symmetry, or tulip, which is integral with a second rotatory shaft.

U.S. Pat. No. 5,330,389 describes a joint comprising a male element that has three arms, one of which is fitted with an outer roller. The arms have a spherical outer surface. Each of the rollers is joined to the arm via an inner ring and a needle crown wheel interposed between the inner ring and the roller. The male element is inserted into a female element provided with rolling tracks and bearings.

In order to prevent jamming of the outer roller in the rolling track during operation, U.S. Pat. No. 5,330,389 on the one hand proposes ensuring that there is sufficient play between the roller and the track, on the opposite side to the driving side. On the other hand, it proposes making the rolling surface of the roller cylindrical, the tracks then having domed surfaces, or giving the tracks planar surfaces and making the rolling surface of the roller domed.

Viewed in section, the bearing areas of the female element and the front surface of the outer roller are inclined with respect to the radial longitudinal plane of the female element. By virtue of this inclination, as the joint is operating the roller's front surface is only applied to the bearing surface that is situated on the contact side between the track and the roller.

During such operation under torque load and at a fracture angle, each outer roller rolling surface is resting on one track of the corresponding pair of tracks, and there is a small amount of play between said rolling surface and the other track of said pair.

Moreover, each arm is in alternating translational motion with respect to the corresponding pair of tracks, parallel to the corresponding radial longitudinal plane. This alternating motion in the radial longitudinal plane is due on the one hand to the arm's inclination and, on the other hand, to the orbital motion, known as offset, of the tripod at triple the frequency of the speed of rotation, something which is well-known in the industry.

Such an alternating motion of the arms induces, in respect of each outer roller, an alternating rocking motion of the roller about the part of its rolling surface that is resting on one of the tracks. The rocking motion is caused on the one hand by the friction created between the spherical bearing area of the arm and the corresponding inner ring, and, on the other hand, by the displacement of the point of contact between the arm's bearing area and the corresponding inner ring.

Accordingly, in respect of each arm, the part of the roller's rolling surface that is diametrically opposed to the supporting one will oscillate.

Such an oscillating motion gives rise to frictional and possibly also jamming phenomena between the roller and the track that is not supporting it.

SUMMARY OF THE INVENTION

The present invention solves these problems by providing a mechanical joint with reduced friction and limiting the risk of jamming when it is operating at a fracture angle.

Moreover, the joint according to the invention must be economical and straightforward to manufacture.

To this end, the present invention provides a constant velocity joint of the aforementioned type, wherein with respect of each arm, each track and the rolling surface are capable of being contacted at not less than one first and one second contact points spaced radially from one another. In respect of at least one of the first and second contact points, the tangent planes of the track and of the rolling surface coincide and are parallel to the radial longitudinal plane. The cross profile of the track is rectilinear or convex, at least at the second contact point, and the cross profile of the rolling surface is rectilinear or convex, at least at the second contact point.

According to particular forms of embodiment, the joint comprises one or more of the following features, taken in isolation or in whatever combination is technically possible. For example, the second contact point is situated radially inwardly with respect to the first contact point. The track's cross profile may be rectilinear or convex at the first contact point and the cross profile of the rolling surface may be rectilinear or convex at the first contact point. The track's cross profile may be concave at the first contact point, and the cross profile of the rolling surface may be convex at the first contact point. The cross profile of the track and of the rolling surface at the first contact point may be an arc of a circle, notably of identical radius.

In respect of each arm, the rolling surface comprises two partial rolling surfaces each of which is operatively associated with a contact point, and the two partial rolling surfaces are axially separated from one another along the axis of the outer roller by a shape incorporated on the outer roller. The shape incorporated on the outer roller is an annular throat or an annular collar. Each track comprises two partial tracks, each of which is operatively associated with one of the contact points, and the two partial tracks are radially separated from one another by a shape incorporated on the track. The shape incorporated on the track is a recess or a collar, which extends parallel to the central axis. The outer roller and the female element comprise cooperating stop surfaces which are adapted to limit radially inward displacement of the outer roller. The stop surfaces are formed by the collars on the female element and by the annular throat on the outer roller, or by the collar of the outer roller and by the recesses of the female element. The stop surfaces are formed by at least one collar arranged on the radially inner side of the tracks and by a radially inner front surface of the outer roller. The stop surfaces define with the radial longitudinal plane an angle of between 20° and 40°, and preferably between 27.5° and 32.5°. The bearing surface is formed by the shape incorporated on the outer roller and by the track shape profile. The roller presents a flat front surface, arranged perpendicularly to an axis of the roller and adapted to come into contact with the bearing surface, and the bearing surface is formed by a bearing area which has a cross profile substantially orthogonal to the radial longitudinal plane corresponding to the contact locations with the flat front surface. The bearing area is formed by two bearing surfaces which extend on either side of the longitudinal radial plane, and the two bearing surfaces are separated by a radially outwardly recessed portion of the female element, or by a single bearing surface which extends on either side of the longitudinal radial plane and from the latter, and the bearing surface is separated from each operatively associated track by a radially outwardly recessed portion of the female element. The bearing area has a rectilinear cross profile. The mechanical transmission unit comprises an inner ring arranged within the outer roller, with a mechanism for coupling the inner ring and the outer roller enabling them to pivot relative to one another on a common axis of revolution, and the inner ring is mounted so as to plunge and slide on the arm.

BRIEF DESCRIPTION OF THE DRAWINGS

The invention will be better understood from reading the following description, which is provided by way of example only and referring to the accompanying drawing wherein.

DETAILED DESCRIPTION

Figure 1:
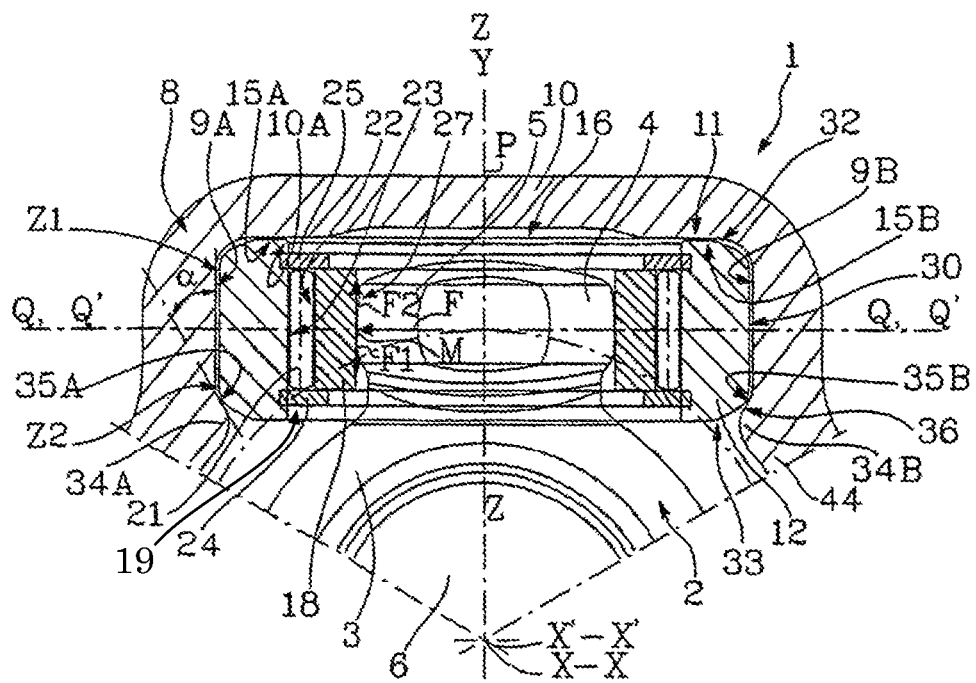
FIG. 1 is a partial cross-sectional view of a tripod constant velocity joint according to a first embodiment of the invention.

FIG. 1 partially illustrates a tripod constant velocity joint 1, designed for a motor vehicle transmission system and comprising essentially the following parts:

(1) A male element or tripod 2, of ternary symmetry with respect to a central axis X-X (orthogonal to the plane of FIG. 1), and comprising a hub 3 and three radial arms 4 which are spaced at a 120° angle and only one of which is represented. The end portion of each arm 4 forms a materially integral, spherical bearing area 5 which is centered on the axis Y-Y of the corresponding arm 4. This male element 2 is integral with a first rotatory shaft 6.

(2) A female element or tulip 8, of ternary symmetry with respect to a central axis X'-X', the latter axis coinciding with the axis X-X in the aligned position of the joint shown. To either side of each arm 4, this tulip presents two opposed tracks 9A and 9B, along with an arch 10 which extends between the tracks 9A and 9B. The arch 10 forms a bearing area 10A. The female element 8 is integral with a second rotatory shaft (not shown).

Unless indicated otherwise, the terms "radial" and "axial" will be used hereinafter with respect to the axis X'-X' of the female element 8.

(3) In respect of each arm 4, a mechanical transmission unit 11 comprising an outer roller 12 having a revolution axis Z-Z, coinciding with the axis Y-Y of the corresponding arm 4 in the position shown in FIG. 1. The outer roller 12 is adapted to roll on one or other of the corresponding tracks 9A and 9B.

Since the three mechanical transmission units 11 are identical, and because of the ternary symmetries of the male element 2 and the female element 8, only the part of the joint 1 that is depicted in FIG. 1 will be described.

The guiding line of the tracks 9A and 9B is, for example, substantially rectilinear and parallel to the axis X'-X'. The tracks 9A, 9B are respectively symmetrical relative to a radial longitudinal plane P (orthogonal to the plane of FIG. 1) of the female element 8.

The tracks 9A, 9B each extend on either side of a median plane Q (orthogonal to the plane P). The cross profiles, i.e. as viewed in a transverse plane to the axis X'-X' such as the plane in FIG. 1, of the tracks 9A, 9B are rectilinear and parallel to the radial longitudinal plane P.

The bearing area 10A is made up of two bearing surfaces 15A, 15B whose cross profiles are rectilinear and orthogonal to the radial longitudinal plane P. Bearing area 10A is situated radially outwardly with respect to the unit 11. The cross profiles of the tracks 9A, 9B and of the bearing surfaces 15A, 15B therefore form between them an angle of 90°.

The bearing surfaces 15A, 15B and the tracks 9A, 9B are linked by curved cross profile portions.

The two bearing surfaces 15A and 15B are separated from one another by a radially outwardly recessed portion 16. Accordingly the area that needs to be hardened is small.

The mechanical transmission unit 11 on the one hand comprises an inner ring 18, which has a generally cylindrical revolution axis Z-Z and is arranged inside the outer roller 12, and, on the other hand, means 19 for coupling the inner ring 18 and the outer roller 12.

The coupling mechanism 19 comprise a needle crown wheel 21 arranged between a radially outer (in relation to the axis Z-Z) cylindrical surface 22 of the ring 18, and a radially inner (in relation to the axis Z-Z) cylindrical surface 23 of the outer roller 12. The coupling mechanism 19 further comprises two flat support rings 24 and 25 arranged on either side of the ring 18 and the needle crown wheel 21.

The periphery of each support ring 24, 25 is housed in an annular groove incorporated in the surface 23. The rings 24 and 25 hold the needle crown wheel 21 and the inner ring 18 therebetween, with slight freeplay along the axis Z-Z. The radial height of the ring 18 is less than the radial height of the roller 12.

The coupling mechanism 19 therefore enables relative pivoting of the roller 12 and the ring 18 about the axis Z-Z and limited relative translation thereof along the axis Z-Z.

The inner ring 18 comprises a substantially cylindrical, radially inner surface 27 with respect to the axis Z-Z, which surface delimits an aperture for receiving the arm 4. The spherical bearing area 5 of the arm 4 and the surface 27 of the ring 18 allow a plunging and sliding motion around the axis Y-Y between the ring 18 and the arm 4.

The outer roller 12 features a peripheral rolling surface 30 that is radially outward of the axis Z-Z. This roller 12 also features a front surface 32 and a rear surface 33.

The rolling surface 30 extends along the axis Z-Z, to either side of a median plane Q' of the roller 12. This plane Q', orthogonal to the axis Z-Z, substantially coincides with the plane Q in the position depicted in FIG. 1. The tracks 9A and 9B and the surfaces 15A and 15B substantially maintain the median plane Q' of the roller 12 orthogonal to the plane P.

The rolling surface 30 is cylindrical with a circular section. Its cross profile is therefore rectilinear, like those of the tracks 9A and 9B.

When the joint 1 is in operation, the contact between one of the tracks 9A or 9B and the rolling surface 30 will be a rectilinear contact. Accordingly, and as the track 9A in FIG. 1 illustrates, there will then be two contact points Z1 and Z2, spaced radially apart and situated to either side of the plane Q'.

The front surface 32 is substantially a plane crown wheel of axis Z-Z. This surface 32 is situated on the radially outer side of the surface 30. The cross profile of the front surface 32 is therefore rectilinear like those of the bearing surfaces 15A and 15B. The rear surface 33 is substantially a plane crown wheel of axis Z-Z, and it is situated radially inside the joint 1.

The surface 30 of the outer roller 12 is joined to the front and rear surfaces, 32 and 33 respectively, by parts of the roller 12 that have curved profiles in meridional section.

The female element 8 furthermore comprises two retaining collars 34A, 34B arranged radially inwardly with respect to the tracks 9A, 9B.

The collars 34A, 34B form stop surfaces 35A, 35B adapted to limit the radially inward displacement of the roller 12. The stop surfaces 35A, 35B extend at an angle .alpha. of 30° with respect to the plane P. More generally, angle .alpha. is preferably between 20° and 40°, and in particular between 27.5° and 32.5°. Accordingly, the female element 8 is straightforward to manufacture by forging, at the same time as cancelling out the risk of the roller 12 becoming jammed.

The roller 12 features a corresponding stop surface 36 which is situated between the surface 30 and the surface 33.

The way in which the joint 1 operates is as follows.

When, for example, the male element 2 is driven in the counter-clockwise direction in FIG. 1, the rolling surface 30 comes to rest against the track 9A in order to transmit the torque to the female element 8.

The arm 4 therefore transmits a force F, parallel to the plane Q', to the mechanical transmission unit 11. The point M of application of this force F is the contact point between the bearing area 5 and the surface 27 of the ring 18.

For each mechanical transmission unit 11, the track 9A and the rolling surface 30 of the roller 12 are resting against one another in the contact points Z1 and Z2. In the present instance, the contact between the track 9A and the surface 30 is a non-punctiform linear contact.

The surface 32 of the roller 12 comes into contact approximately perpendicularly with the bearing surfaces 15A and 15B, presenting no risk of jamming.

When the joint 1 is operating at a fracture angle between the shafts with axes X-X and X'-X', the arm 4 executes a radially translational alternating motion with respect to the tracks 9A and 9B, in the plane P, as is well-known in the industry.

When, in the course of said alternating motion, the arm 4 moves radially inwardly of the joint 1 (downwards in FIG. 1), the point M of application of the force F moves radially inwardly of the joint 1, the effect of which is to try to make the roller 12 rock in the clockwise direction in FIG. 1. Moreover, during said displacement, the arm 4 exerts by friction a force F1 on the inner ring 18 along the axis Z-Z, which force F1 is directly radially inwardly of the tulip 8. This force F1 would also try to make the roller 12 rock in the clockwise direction in FIG. 1.

Because the contact between the surface 30 and the track 9A made at two points Z1 and Z2 spaced radially from one another, the median plane Q' of the roller 12 is maintained substantially parallel to the plane Q. The roller 12 therefore essentially moves translationally along the tracks 9A, 9B. The roller 12 is held radially inward by the simultaneous application of surface 36 onto surfaces 35A and 35B.

When the arm 4 moves radially outwardly of the joint 1 (upward in FIG. 1), the point M of application of the force F shifts in the same direction. Simultaneously, the arm 4 exerts by friction a force F2 on the inner ring 18, along the axis Z-Z and directed outwardly of the tulip 8. The displacement of the point M and the force F2 move the roller 12 radially outwards, until the front surface 32 comes up against the surfaces 15A and 15B. The force F2 tries to keep the outer roller 12 resting against the bearing surfaces 15A and 15B.

Accordingly, the outer roller 12 remains stable, without oscillation of the part thereof that faces the track 9B, upon which it is not supported.

The oscillations of the roller 12, and hence the risk of the latter jamming when the joint 1 is operating at a fracture angle are therefore limited.

Lastly, the curved profiles in the portions connecting the tracks 9A and 9B to the bearing surfaces 15A and 15B make it possible to avoid the heavy pressures at the supporting ends between the central region of the outer roller 12 and the tracks 9A and 9B.

The joint according to the invention is furthermore straightforward and economical to manufacture thanks to the cylindrical rolling surface 30 and to the tracks 9A, 9B with their rectilinear profiles.

Figure 2:
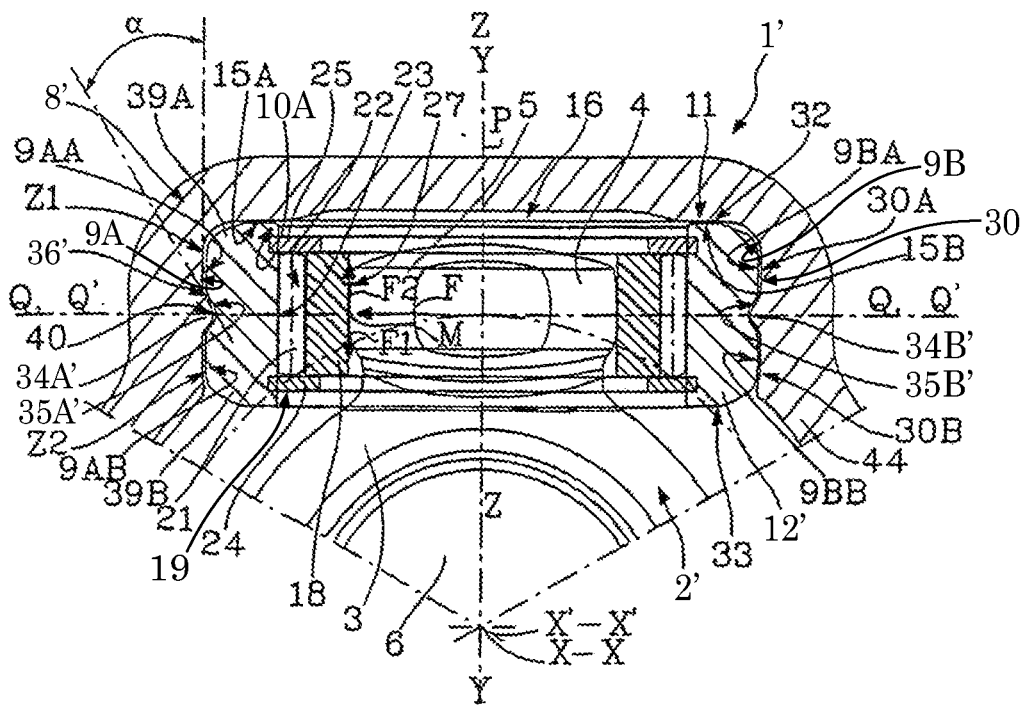
FIGS. 2 to 5 are similar views to FIG. 1, each illustrating a different form of embodiment of a tripod constant velocity joint according to the invention.

FIG. 2 illustrates a second form of embodiment of a constant velocity joint 1' according to the invention, differing from the one depicted in FIG. 1 as follows.

This joint 1' comprises an outer roller 12' whose rolling surface 30 is made up of two partial rolling surfaces 30A, 30B. These partial rolling surfaces 30A, 30B are radially separated from one another, and hence axially separated along axis Z-Z.

The surfaces 30A, 30B are formed by two ribs 39A, 39B which are separated by an annular central groove 40. The radially outer portion of said groove 40 constitutes the stop surface 36'.

Furthermore, each track 9A and 9B comprises two pairs of partial tracks 9AA, 9AB and 9BA, 9BB. The partial tracks 9AA, 9AB and 9BA, 9BB of each of the pairs of tracks are separated radially from one another by a central collar 34A', 34B' which constitutes the stop surface 35A', 35B'.

The partial rolling surface 30A and the partial tracks 9AA and 9BA form a first contact zone comprising point Z1, whereas the partial rolling surface 30B and the partial tracks 9AB and 9BB form a second contact zone comprising point Z2. The two contact points Z1 and Z2 are separated radially from one another by a non-contact portion in which the roller 12' is out of contact with the female element 8'.

The cross profiles of the partial tracks 9AA, 9AB and 9BA, 9BB are rectilinear and the two partial tracks of any one track 9A or 9B are coplanar.

To put it another way, the collars 34A', 34B' are offset radially outwardly with respect to the joint in FIG. 1. Consequently, the collars 34A', 34B' may extend as far as the axial end of the tracks 9A', 9B' on the open side of the female element 8'. Accordingly, the roller 12 is held radially inwardly by the collars 34A', 34B' even when it is at the axial end of the track 9A, 9B.

Moreover, because of this feature, each portion 44 of the female element 8' which extends between the tracks 9A, 9B of two pairs of adjacent tracks may be beveled at the open end of the female element. Thus, the joint 1' may have a large maximum fracture angle when the tripod is at the bottom of the female element 8'.

It should be noted that between the groove 40 and the collars 34A', 34B' there exists a sufficient amount of play to allow the front surface 32 of the roller 12 to be applied to the surfaces 15A, 15B.

Figure 3:
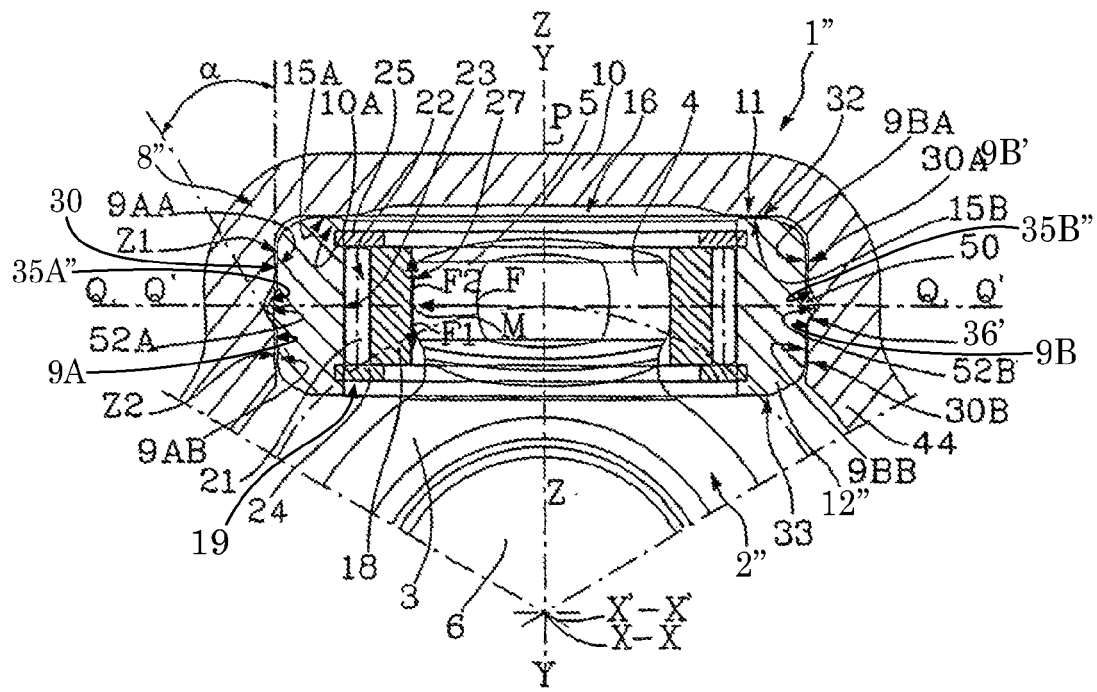

FIG. 3 illustrates a third form of embodiment of a constant velocity joint 1" according to the invention, differing from the one in FIG. 2 as follows.

The partial rolling surfaces 30A, 30B are separated from one another by a central collar 50 which forms the stop surface 36'.

The partial tracks 9AA, 9AB and 9BA, 9BB are separated by a groove 52A, 52B which extends parallel to the axis X-X and forms the stop surface 35A", 35B".

Figure 4:
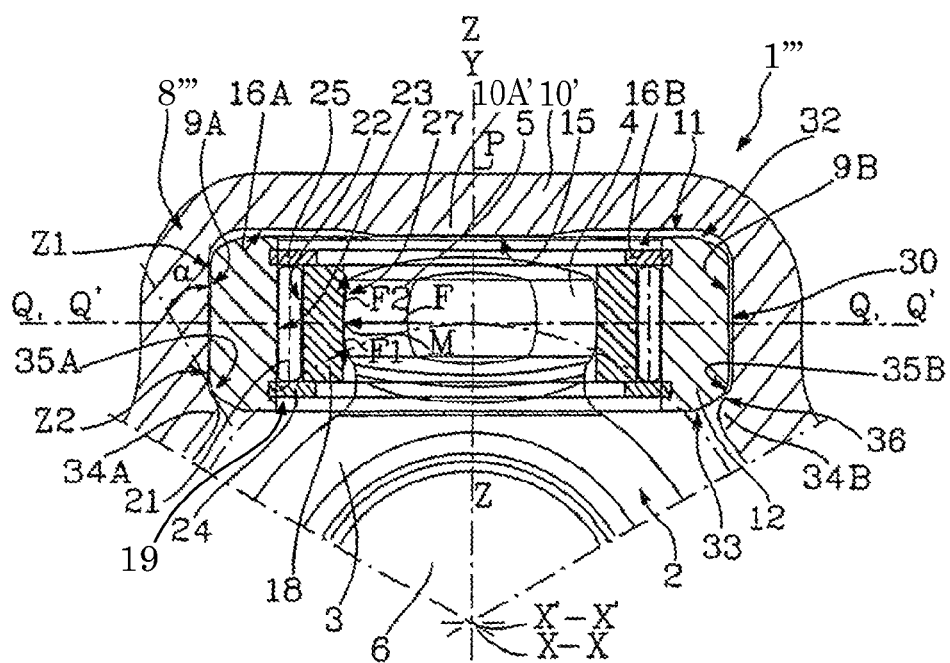

FIG. 4 illustrates a fourth form of embodiment of a constant velocity joint 1'" according to the invention, differing from the one illustrated by FIG. 1 as follows.

The female element 8'" of said joint comprises a bearing area 10' constituted by a single bearing surface 15 which extends from the longitudinal radial plane P on either side thereof.

The bearing area 10' is separated from each track 9A, 9B by a radially outwardly recessed portion 16A, 16B of the female 8'".

The recessed portions 16, 16A and 16B of the joints seen in FIGS. 1 to 4 make it possible to reduce the area that needs to be heat-treated and therefore produce little deformation of the female elements 8, 8', 8" and 8'" during manufacture.

Because of the arrangement of an inner ring 18 whose radial height is less than the height of the roller 12, the joint takes up little room. Furthermore, the interface between the hub 3 and the arm 4 may be broad, and imparts great rigidity to the joint for a given package size. In addition, the fact that the roller 12 is applied to the surfaces 15, 15A, 15B and 35A, 35A', 35A", 35B, 35B', 35B" means that it is guided well.

Moreover, because of the cylindrical surface 30 operatively associated with the tracks 9A, 9B with their rectilinear profile, the play between the roller 12 and the tracks 9A, 9B may be small, thereby making the joint quiet whenever there is a change in the direction of rotation.

Figure 5:
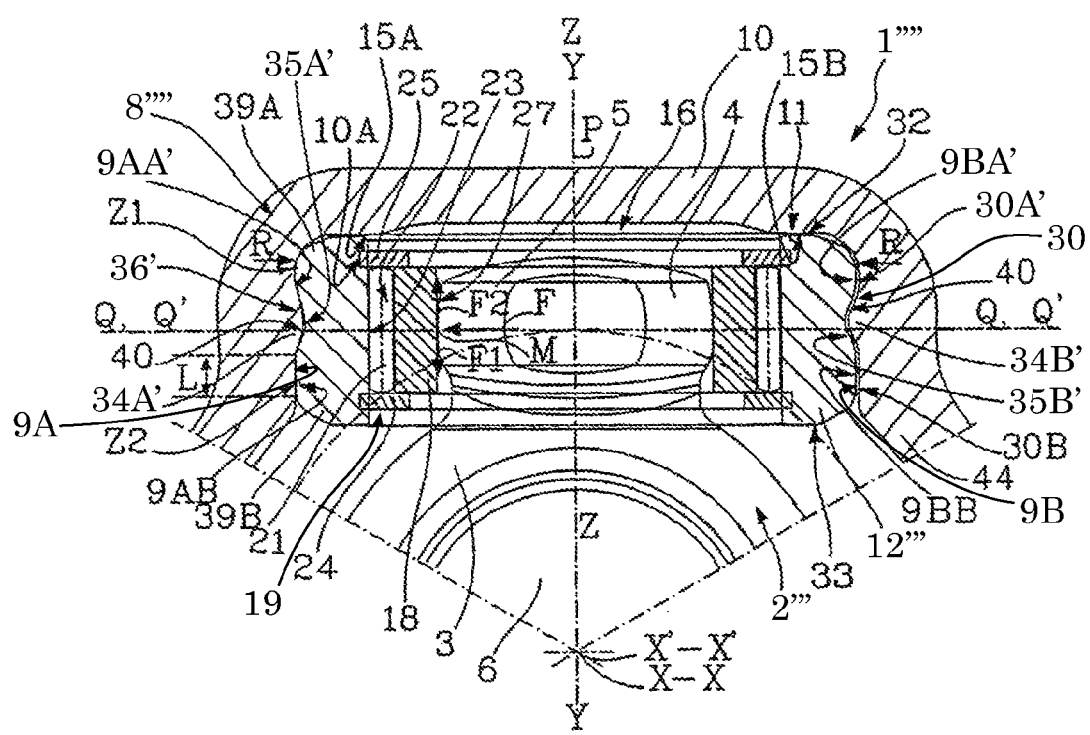

FIG. 5 represents a fifth form of embodiment of the joint 1"" according to the invention.

This joint comprises partial tracks 9AA' and 9BA', each of which has a concave cross section in the shape of an arc-of-circle of radius R. The partial tracks 9AB and 9BB have rectilinear sections, identical to those of the partial tracks 9AB and 9BB of the joint seen in FIG. 3.

The partial rolling surface 30A' has a convex radial section in the shape of an arc of a circle with a radius equal to radius R. According to one variant it is smaller than radius R. The partial rolling surface 30B has the shape of a cylinder and is identical to the partial rolling surface 30B of the roller in FIG. 3.

This joint is particularly practical because the radial position of the roller 12'" is defined by the tracks 9AA', 9BA' and by the rolling surface 30 partially in arc-of-circle sections. The retention of the roller 12'" vis-a-vis any radially outward displacement is therefore effected at least partly by the concave partial tracks 9AA' and 9BA' and by the partial rolling surface 30A' of radial arc-of-circle section of the roller. Furthermore, the contact surface is large for a given axial dimension.

At the same time, the partial track with the rectilinear section 9AB, 9BB eliminates the need to observe low radial positioning tolerances between the partial tracks 9AB, 9BB and 9AA', 9BA'.

The fact of arranging the concave sectional, partial tracks 9AA', 9BA' radially outside the rectilinear sectional, partial tracks 9AB, 9BB produces large transitional radius between the track 9A, 9B and the arch 10. This arrangement is helpful to forging the female element 8"".

In another variant, the joint seen in FIG. 5 is equipped with bearing surfaces 15, 15A, 15B formed by the arch 10.

According to another variant of the joint (not shown), the collars 34A', 34B' of the female element 8', 8"" form the bearing surfaces of the roller 12', 12'". To this end, the play that exists between the front surface of the roller 32 and the arch 10 is greater than the play that exists between the collars 34A', 34B' and the groove 40. This feature of the joint may be applied in analogous fashion to all the joints described. Furthermore, the bearing surfaces 15A, 15B may be formed by the collar 50 and the grooves 52A, 52B. Accordingly, the roller 12', 12", 12'" is retained axially outwardly by application against the collars 34A', 34B' or against the grooves 52A, 52B.

According to a further variant (not shown), the joint features a female element 8 having continuous tracks 9A, 9B, as depicted in FIG. 1, and an outer roller 12' featuring two partial rolling surfaces 30A, 30B, separated by an annular central groove 40, such as the roller 12' seen in FIG. 2.

According to yet another variant, the joint features a female element 8", equipped with partial tracks 9AA, 9AB, 9BA, 9BB which are separated by a groove 52A, 52B, such as the female element 8" seen in FIG. 3, and an outer roller 12 having a continuous rolling surface 30, such as the one in FIG. 1, or partial rolling surfaces 30A, 30B separated by an annular groove 40, such as the one in FIG. 2.

Figure 6:
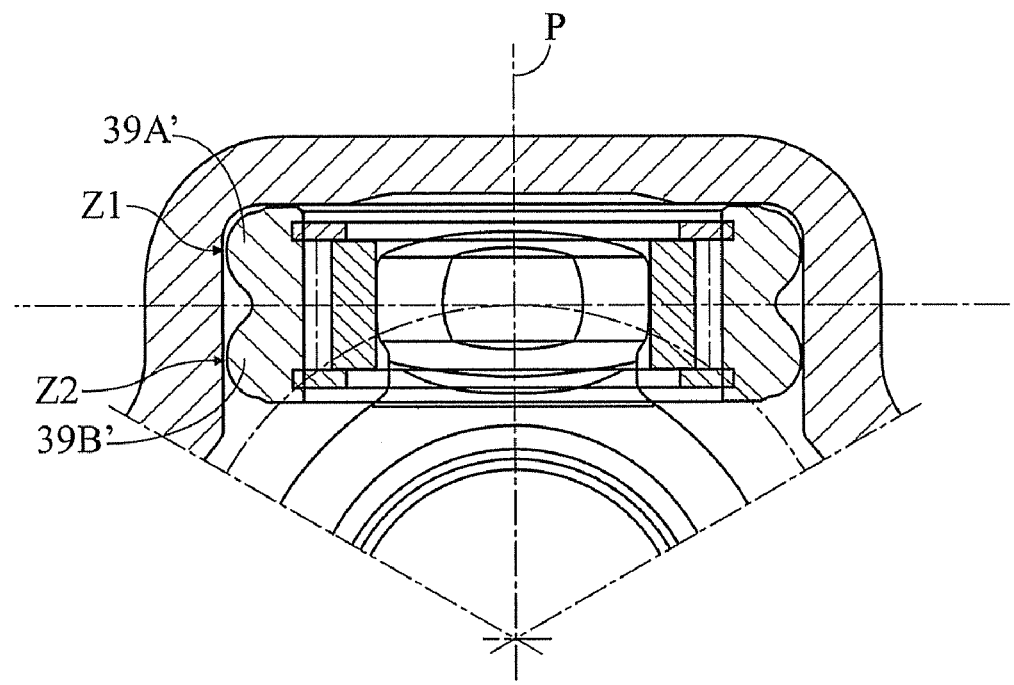
FIG. 6 is a partial cross-sectional view of a tripod constant velocity joint including a roller having a convex domed cross section.
Figure 7:
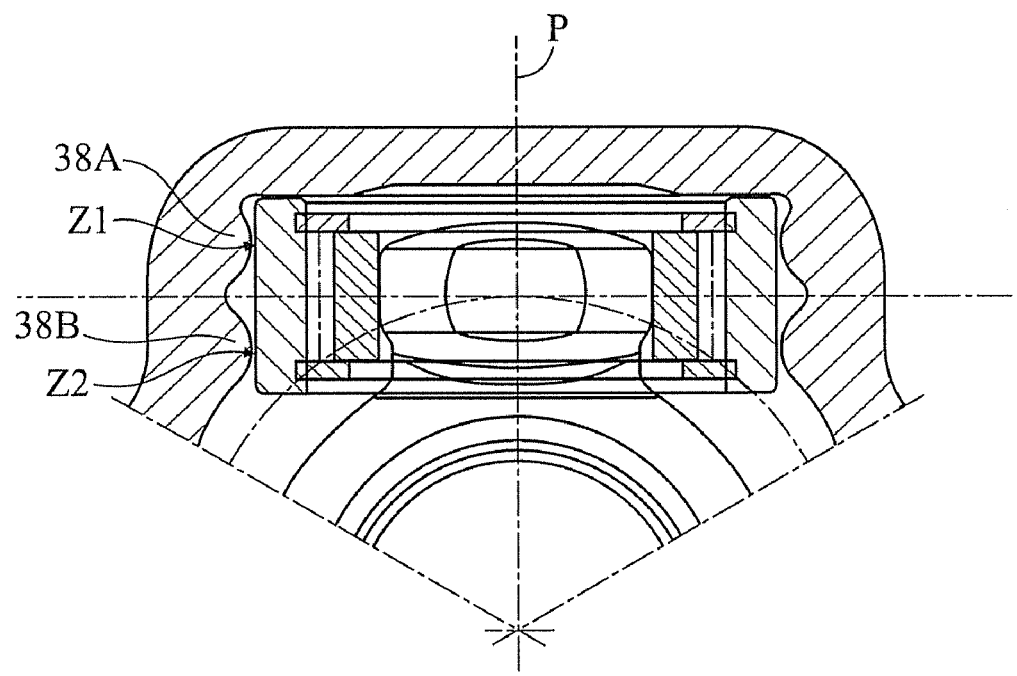
FIG. 7 is a partial cross-sectional view of a tripod constant velocity joint including a rolling track having a convex domed cross section.

In yet another variant, each partial rolling track is formed by ribs 38A and 38B of convex domed cross section, as shown in FIG. 7, and/or each of the ribs 39A', 39B' of the roller has a convex domed cross section, as shown in FIG. 6. These cross sections are arranged in such a way that the tangent planes of the track and of the rolling surface, at the contact points Z1, Z2, coincide and extend parallel to the radial longitudinal plane P.

These variants are straightforward to manufacture by forging, owing to the relatively small area that has a section running parallel to the plane P.

The invention claimed is:

1. A constant velocity joint comprising:
   a male element having multiple arms;
   a female element having a central axis (X'-X') and defining, in respect of each arm, a pair of opposed tracks situated on either side of said arm and being symmetrical in relation to a radial longitudinal plane (P) of the female element; and
   mounted on each aim, a mechanical transmission unit comprising an inner ring arranged within an outer rotating roller and a mechanism for coupling the inner ring and the outer roller enabling them to pivot relatively on a common axis of revolution (Z-Z), the inner ring being mounted so as to plunge and slide in relation to the arm, the outer roller being adapted to roll on one or other of the corresponding tracks via a peripheral rolling surface of circular cross-section, the female element further comprising at least one bearing surface which keeps the roller from becoming displaced radially outwards,
   wherein for each arm, each track and the rolling surface are capable of being contacted at not less than one first (Z1) and one second (Z2) contact points, and for at least one of the first and second contact points (Z1, Z2), tangent planes of the track and of the rolling surface coincide and are parallel to the radial longitudinal plane (P),
   a cross profile of the track is rectilinear or convex, at least at the second contact point (Z2),
   a cross profile of the rolling surface is rectilinear or convex, at least at the second contact point (Z2), and a cross profile of the track is concave at the first contact point (Z1), and a cross profile of the rolling surface is convex at the first contact point (Z1).

2. A joint according to claim 1, wherein the second contact point (Z2) is situated radially inward of the first contact point (Z1).

3. A joint according to claim 1, wherein the cross profile of the track and of the rolling surface is an arc of identical radius, at the first contact point.

4. A joint according to claim 1, wherein the outer roller and the female element comprise cooperating stop surfaces which are adapted to limit radially inward displacement of the outer roller.

5. A joint according to claim 4, wherein the stop surfaces are formed by collars on the female element and by an annular groove on the outer roller.

6. A joint according to claim 4, wherein the stop surfaces define with the longitudinal radial plane (P) an angle of between 20° and 40°.

7. A joint according to claim 1, wherein, for each arm, a bearing area is formed by two bearing surfaces which extend on either side of the radial longitudinal plane (P), the two bearing surfaces being separated by a radially outwardly recessed portion of the female element.

8. A joint according to claim 7, wherein each track comprises two partial tracks, each of which is operatively associated with one of the contact points (Z1, Z2), the two partial tracks being separated radially from one another by a track shape profile, the bearing surface coinciding with the track shape profile and cooperating with the shape incorporated on the outer roller.

9. A constant velocity joint, comprising:
a male element having multiple arms;
a female element having a central axis (X'-X') and defining, in respect of each arm, a pair of opposed tracks situated on either side of said arm and being symmetrical in relation to a radial longitudinal plane (P) of the female element; and
mounted on each arm, a mechanical transmission unit comprising an inner ring arranged within an outer rotating roller and a mechanism for coupling the inner ring and the outer roller enabling them to pivot relatively on a common axis of revolution (Z-Z), the inner ring being mounted so as to plunge and slide in relation to the arm, the outer roller being adapted to roll on one or other of the corresponding tracks via a peripheral rolling surface of circular cross-section, the rolling surface comprising two partial rolling surfaces, each of which is operatively associated with a contact point (Z1, Z2), the two partial rolling surfaces being separated from one another axially along the axis of the outer roller by a shape incorporated on the outer roller, wherein the shape incorporated on the outer roller is an annular groove or annular collar, the female element further comprising at least one bearing surface which keeps the roller from becoming displaced radially outwards,
wherein for each arm, each track and the rolling surface are capable of being contacted at not less than one first (Z1) and one second (Z2) contact points, and for at least one of the first and second contact points (Z1, Z2), tangent planes of the track and of the rolling surface coincide and are parallel to the radial longitudinal plane (P),
a cross profile of the track is rectilinear or convex, at least at the second contact point (Z2), and
a cross profile of the rolling surface is rectilinear or convex, at least at the second contact point (Z2).

10. A joint according to claim 8, wherein, for each arm, a bearing area is formed by two bearing surfaces which extend on either side of the radial longitudinal plane (P), the two bearing surfaces being separated by a radially outwardly recessed portion of the female element.

11. A constant velocity joint, comprising:
a male element having multiple arms;
a female element having a central axis (X'-X') and defining, in respect of each arm, a pair of opposed tracks situated on either side of said arm and being symmetrical in relation to a radial longitudinal plane (P) of the female element, each track comprising two partial tracks, each of which is operatively associated with one of the contact points (Z1, Z2), the two partial tracks being separated radially from one another by a track shape profile, wherein the track shape profile is a collar extending parallel to the central axis; and
mounted on each arm, a mechanical transmission unit comprising an inner ring arranged within an outer rotating roller and a mechanism for coupling the inner ring and the outer roller enabling them to pivot relatively on a common axis of revolution (Z-Z), the inner ring being mounted so as to plunge and slide in relation to the arm, the outer roller being adapted to roll on one or other of the corresponding tracks via a peripheral rolling surface of circular cross-section, the female element further comprising at least one bearing surface which keeps the roller from becoming displaced radially outwards,
wherein for each arm, each track and the rolling surface are capable of being contacted at not less than one first (Z1) and one second (Z2) contact points, and for at least one of the first and second contact points (Z1, Z2), tangent planes of the track and of the rolling surface coincide and are parallel to the radial longitudinal plane (P),
a cross profile of the track is rectilinear or convex, at least at the second contact point (Z2), and
a cross profile of the rolling surface is rectilinear or convex, at least at the second contact point (Z2).

12. A joint according to claim 11, wherein, for each arm, a bearing area is formed by two bearing surfaces which extend on either side of the radial longitudinal plane (P), the two bearing surfaces being separated by a radially outwardly recessed portion of the female element.

* * * * *

UNITED STATES PATENT AND TRADEMARK OFFICE
CERTIFICATE OF CORRECTION

| | | |
|---|---|---|
| PATENT NO. | : 7,753,799 B2 | Page 1 of 1 |
| APPLICATION NO. | : 10/584795 | |
| DATED | : July 13, 2010 | |
| INVENTOR(S) | : Marc Francois | |

It is certified that error appears in the above-identified patent and that said Letters Patent is hereby corrected as shown below:

In the Claims:

In Column 8, Claim 1, line 47, change "aim," to -- arm, --

In Column 9, Claim 8, line 25, change "claim 7," to -- claim 9, --

Signed and Sealed this

Thirty-first Day of August, 2010

David J. Kappos
*Director of the United States Patent and Trademark Office*